United States Patent [19]

Baba

[11] 4,135,086
[45] Jan. 16, 1979

[54] AUTOMATIC RECORD PLAYER OF LINEAR TRACKING PICKUP ARM TYPE

[75] Inventor: Mitsuru Baba, Hamamatsu, Japan

[73] Assignee: Nippon Gakki Seizo Kabushiki Kaisha, Hamamatsu, Japan

[21] Appl. No.: 782,511

[22] Filed: Mar. 29, 1977

[30] Foreign Application Priority Data

Apr. 1, 1976 [JP] Japan .................................. 51/36383

[51] Int. Cl.$^2$ ................................................ H01J 3/14
[52] U.S. Cl. ............................ 250/237 G; 274/9 RA; 274/23 A
[58] Field of Search ................ 250/237 G; 274/9 RA, 274/23 A; 356/169

[56] References Cited

U.S. PATENT DOCUMENTS

| 3,506,269 | 4/1970 | Hannah | 274/9 RA X |
| 4,039,826 | 8/1977 | Wingate | 250/237 G |

FOREIGN PATENT DOCUMENTS 2305821  10/1976  France .............................. 274/9 RA X Primary Examiner—Lawrence J. Dahl
Attorney, Agent, or Firm—Cushman, Darby & Cushman

[57] ABSTRACT

In a linear tracking pickup arm type automatic record player, the position of the pickup arm is opto-electrically detected by the use of a multi-window scale and a photo-coupler unit, and the pre-assigned position signals stored in a memory are compared with the detected position signal to control the movement of the pickup arm. Therefore, the reproduction and the precisely repeated reproduction of any part of a record disk are made possible.

3 Claims, 1 Drawing Figure

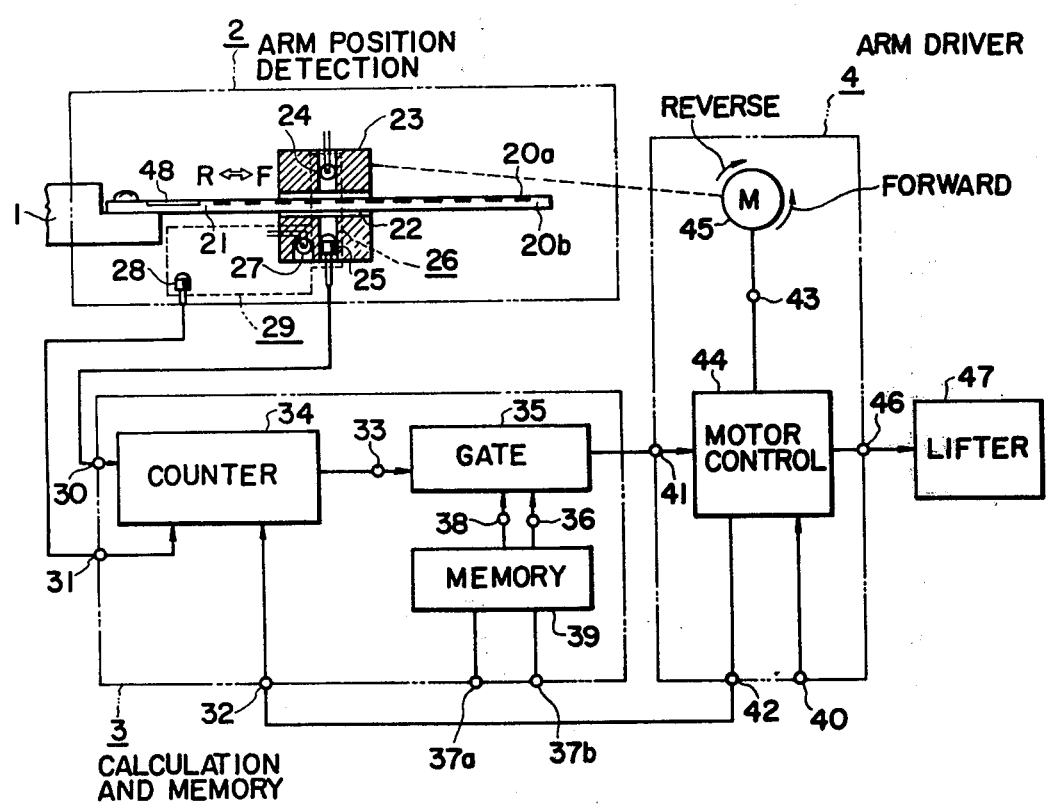

AUTOMATIC RECORD PLAYER OF LINEAR TRACKING PICKUP ARM TYPE

BACKGROUND OF THE INVENTION (a) Field of the Invention

The present invention relates to a pickup arm control system for use in a record player or a video disk player or the like, and more particularly it pertains to a controlling system for controlling a linear tracking pickup arm in a disk player or the like.

(b) Description of the Prior Art

Among the known various kinds of pickup arm driving systems for use in a record player or the like, the pivotable pickup arm system is inevitably accompanied by tracking errors which, in turn, generate secondary harmonic distortions. Therefore, the reproduction fidelity is inevitably low. For removing this drawback of the pivotable pickup arm system, there has been proposed a linear tracking pickup arm system and has been placed into practice. This linear tracking pickup arm system is arranged so that a pickup arm is caused to translate linearly in parallel with the direction tangential to the record groove of the disk so as to trace the groove always in a fixed linear direction, to thereby avoid the occurrence of the horizontal tracking errors.

Also, as the automatic player equipped with a known linear tracking pickup arm system, there have been put to practice those types such as the one in which the trace initiation position of the pickup arm is determined by first detecting the size of the record disk and then by means of this detection signal generated, or the one in which is provided means for generating a signal for controlling the pickup arm at a predetermined position of the pickup arm which corresponds to the size of the record disk and the trace initiation position is determined by this signal.

Such conventional pickup arm control systems as mentioned above designed for the linear tracking pickup arm system are capable of carrying out an automatic reproduction of the whole one side of the record disk or repeated reproductions of the whole one side of the disk, but they are not capable of carrying out a reproduction or repeated reproductions of any specific groove region of a record disk.

Thus, when one wishes to reproduce, for example, a desired particular piece of music which represents a certain part of the whole recorded music in a record disk, the automatic player equipped with the known linear tracking pickup arm system is quite inconvenient for the user.

SUMMARY OF THE INVENTION

The present invention is intended to eliminate such drawbacks and inconveniences as mentioned above of the automatic player having the known linear tracking pickup arm system.

It is, therefore, an object of the present invention to provide an improved automatic player having a linear tracking pickup arm system capable of arbitrarily setting the position of controlling the pickup arm.

Another object of the present invention is to provide a system for externally and preliminarily controlling the reproduction of the recorded information of a record disk and precisely performing a desired programmed automatic reproduction.

According to an aspect of the present invention, there is provided a controlling system for a pickup arm in a record player or the like, comprising: means for detecting the position of the pickup arm; calculation and memory means operated by a signal supplied from said position detection means; and means for driving the pickup arm which is operated under the control of said calculation and memory means, thereby enabling the reproduction and the repeated reproduction of any arbitrary part of a record disk by externally and preliminarily controlling said calculation and memory means.

Other objects, features and advantages of the present invention will become apparent by reading the following detailed description of the preferred embodiment when taken in conjunction with the accompanying drawing.

BRIEF DESCRIPTION OF THE DRAWING

The drawing is a schematic block diagram showing a control system controlling a linear tracking pickup arm according to an embodiment of the present invention.

DETAILED DESCRIPTION OF THE PREFERRED EMBODIMENT

Description will be made hereunder of a preferred embodiment of the present invention by referring to the drawing. The controlling system for a linear tracking pickup arm shown in the drawing comprises: a pickup arm position detection unit 2, a calculation and memory unit 3, and a linear tracking arm driving unit 4. The arm position detection unit 2 includes a scale 21 fixed to a turn table panel 1, a position signal generator 26 interlocked with a linear tracking pickup arm (not shown) and a re-set signal generator 29 which will be described later. The calculation and memory unit 3 is driven by the output signal generated by the position detection unit 2, and the driving unit 4 controls the translation movement of the linear tracking pickup arm by the signal supplied form the calculation and memory unit 3.

In the pickup arm position detection unit 2, the scale 21 of a plate shaped member carries opaque portions 20a and transparent portions or windows 20b of respective constant widths in the longitudinal direction of the scale and disposed by turns at a constant pitch, and a carrier block 23 having a slit 22 for passing the scale 21 therethrough in such a way as not to interfere with the free relative displacement of this scale 21 is provided to saddle over the scale 21 and is interlocked and movable with the linear tracking pickup arm. On this carrier block 23, a light-emitting element 24 such as a lamp or a photoluminescent diode is provided on one side of the scale 21, and a light detector 25 such as a phototransistor or a photodiode is arranged at a position opposing to the light-emitting elements 24 on the other side of the scale 21, to constitute a position signal generator 26 of the pickup position detection unit 3. Similarly, the re-set signal generator 29 includes a light-emitting element 27 such as a lamp or a photoluminescent diode provided on the carrier block 23 and a light detector 28 such as a phototransistor or a photodiode provided on the same side of the scale 21 with the light emitting element 27 and at a position in the neighborhood of the pickup arm rest position.

The calculation and memory unit 3 comprises: an addition-subtraction counter 34 which is controlled by the signal received from the light detectors 25 and 28 and by the signal supplied from a motor-control circuit 44 of the pickup arm driving unit 4; a gate circuit 35 which is on-off controlled by the output of the addition-subtraction counter 34; and memory circuit 39 for controlling said gate circuit 35. More specifically, the addition-subtraction counter 34 has an input terminal 30 for receiving the output signal from the position-detecting light detector 25, a re-set terminal 31 for receiving the output of the re-setting light detector 28, an addition-subtraction change-over terminal 32 for receiving the signal from the motor-controlling circuit 44, and an output terminal 33 for supplying a gate-controlling signal. The memory circuit 39 has setting signal input terminals 37a and 37b, and a gate-controlling output terminals 36 and 38 for supplying signals for controlling the gate circuit 35.

The linear tracking pickup arm driving unit 4 comprises: a motor 45 for driving a linear tracking pickup arm, and the motor-controlling circuit 44 having a starting signal input terminal 40, a controlling signal input terminal 41 for receiving the output signal of the gate circuit 35, an addition-subtraction change-over signal output terminal 42 for controlling the addition-subtraction counter circuit 34, a motor-driving output terminal 43 and a lifter controlling output terminal 46 for an arm lifter 47.

Now, description will be made with respect to the operation of this system. When a start instruction input is supplied externally to the starting signal input terminal 40 of the motor-controlling circuit 44, the circuit 44 produces a motor driving signal at the output terminal 43 and then the motor 45 begins forward rotation. Then, the position signal generator 26 which is interlocked with the linear tracking pickup arm is moved along the scale 21 rightwardly in the drawing. Thus, the beam of light emitted from the light-emitting element 24 are intermittently received by the light detector 25 due to the zebra-patterned scale 21. Thus, the light detector 25 supplies a pulse-like output signal to the addition-subtraction counter 34 through the input terminal 30.

If the position where the circuit 44 produces a signal at the terminal 46 to drive the pickup arm lifter 47 for lowering the linear tracking pickup arm (i.e., the trace initiating position) is preliminarily set in the memory circuit 39 through a first setting terminal 37a, the pickup arm position identifying count which is generated from the counter 34 and the assigned position identifying count set by the input which is supplied from the terminal 37a to be delivered through the first output terminal 38 to the gate circuit 35 are compared with each other in the gate circuit 35. When these two counts are brought into coincidence, the gate circuit 35 supplies a motor-controlling signal to the motor-controlling circuit 44 through the terminal 41 to stop the rotation of the motor 45.

While the motor-controlling circuit 44 stops the rotation of the motor 45, and hence the translation movement of the linear tracking pickup arm, it also controls a pickup arm lifter 47 to lower the position of this pickup arm.

A position for lifting the pickup arm (i.e., the trace termination position) may be set in the memory circuit 39 through the second setting terminal 37b so that the corresponding signal is delivered through the second output terminal 39 to the gate circuit 35. Then as the counter 34 counts the output pulses from the position signal generator 26 up to the assigned count corresponding to the pickup arm lifting position, the motor-control circuit 44 controls the pickup arm lifter 47 to lift the arm upwardly.

A repeated reproduction of the record in a region between any two assigned positions can be performed in the following manner. Namely, the initiation and termination positions for each repeated reproduction may be assigned through a first and a second setting terminal 37a and 37b. When output of the counter 34 coincides with the first setting count in the memory 38, the gate 35 delivers a signal to the motor control circuit 44, the circuit 44 controlling the motor 45 to stop the pickup arm translating operation, and then the pickup arm lifter 47 to lower the pickup arm. When the output of the counter 34 comes to the second setting count, the gate 35 again produces a signal to the motor control circuit 44 so that the circuit 44 controls the lifter 47 to lift the pickup arm and then the motor 45 to carry out its reverse rotation and that simultaneously produces the addition-subtraction change-over signal to the counter 34. The reverse rotation of the motor is performed until the output of the counter 34 coincides with the first setting count where the motor 45 stops its reverse rotation and the lifter 47 lowers the pickup arm. Thus, the above described operation is repeated up to the desired number of times. The range of the reproduction to be repeated can be arbitrarily set through the position-assigning signals supplied to the first and second setting terminals 37a and 37b. In this manner, the reproduction of the record on the whole one side or a part thereof can be freely performed.

As described above, the circuit 44 is so constructed that upon first reception of the signal from the gate 35 the circuit 44 produces the translation-stop signal for the motor 45 and the lowering signal for the lifter 47, and that upon second reception of the gate signal the circuit 44 produces the lifting signal for the lifter 47 and the reverse rotation signal for the motor 45.

The position setting and controlling system of the invention is preferably combined with a usual driving circuit for a linear tracking pickup arm wherein the motor 45 serves also as a motor for the normal feeding of the pickup arm in the reproduction state of a disc. In such a case, the motor 45 does not stop its forward rotation upon the above-mentioned first reception of the gate signal but continues the forward rotation at a relatively slow speed to feed the pickup arm in accordance with the reproduction of the disc. The forward and the reverse rotation of the motor 45 is determined by the motor-controlling circuit 44. A signal representing the forward or the reverse rotation is supplied from the addition-subtraction change-over signal output terminal 42 of the motor-controlling circuit 44 to the addition-subtraction change-over terminal 32 of the addition-subtraction counter 34 to perform correct counting for identifying the position of the pickup arm. When the rotation of the motor is forward, the counter circuit 34 performs addition. When the rotation of the motor is reverse, the counter circuit 34 performs subtraction. Here, the counter circuit 34 is arranged to generate the same count output at the same position, regardless of the direction of rotation of the motor.

Furthermore, the repeated reproduction may be terminated by the provision of another counter and a comparator. Namely, the number of the repeated reproductions may be counted in this another counter and compared with a set number for the repeated reproduction. When the two counts coincide with each other, the repeated reproduction may be terminated by returning the pickup arm to the pickup arm rest position.

When the reproduction has terminated, the linear tracking pickup arm is returned to the pickup arm rest position. Here, the position signal generator 26 is translated leftwardly with the linear tracking pickup arm. When the light detector 28 receives the light emitted from the light-emitting element 27, it generates a re-setting signal and supplies it to the re-set terminal 31 of the addition-subtraction counter 34. Then, all of the contents in the addition-subtraction counter 34 are cleared to maintain the positional accuracy. If the scale 21 is provided with a relatively wide transparent portion or window 48 at a position thereon corresponding to the pickup arm rest position and the light detector 25 is so constructed that it permits the light from the element 24 to be partially passed therethrough or therearound, the light detector 28 can receive the light from the element 24 when the pickup arm reaches its rest position. Then, the light emitting element 27 can be spared. Further, if the counter 34 is so constructed that when it receives a predetermined long continuous signal from the detector 25, i.e., when the light emitting element 24 reaches the wide transparent portion 48 on the scale 21 all the contents in the counter 34 are cleared, then the light detector 28 is also spared. On the other hand, the scale 21 can carry two or more signal tracks located parallel to each other for conducting two or more kinds of controls, i.e., automatic repeat and pickup arm rest position detection, if corresponding light emitting and detecting elements are provided accordingly.

In the above-mentioned embodiment, the scale 21 and the light detector 28 are fixed, and the block 23 carrying the light-emitting elements 24 and 27 as well as the light detector 25 are arranged so as to be movable. It will be apparent that, alternatively, the carrier block 23 may be fixed, and the scale 21 and the light detector 28 may be arranged so as to be movable, and yet similar effects are achieved.

As has been described above, according to the above-described embodiment, the signal which is provided from a position-detector means for detecting the position of the pickup arm is counted in a counter additively or subtractively and is compared with the position-assigning input signal. When the contents of the two positional signals coincide with each other, a gate circuit is rendered on to supply a controlling signal to a motor-driving circuit to forward or reversely revolve the motor. Furthermore, when the pickup arm returns to a pickup arm rest position, the contents of the counter are cleared to insure the positional accuracy and to prepare for the next operation. Thus, reproduction and repeated reproductions can be automatically performed between any two groove positions of a record disk. The record disk which is used may be of any size and of any color.

Furthermore, this system is incorporated in a linear tracking pickup arm player, displacement distance of the position signal generator 26 on the scale 21 can be easily equalized to that of a reproducing stylus on the pickup arm. Therefore, precise repeat reproduction can be conducted.

Furthermore, since the detection of the position of the pickup arm is carried out in contactless manner, the position detection gives no adverse influence to the quality of the reproduced sounds, and provides a high reliability. In addition, since the detection of the position of the pickup arm can be achieved purely electrically, the response is rapid, and what is more there can also be provided the signals for controlling other mechanisms. Still further, the present invention provides a further advantage that the system can be reduced in size and weight.

I claim:

1. A system for selectively positioning a linear tracking pickup arm of a recording apparatus, comprising:
   a reversible motor joined to said pickup arm and adapted to move the arm linearly when said motor is energized;
   arm position-detecting means operatively related to the pickup arm for producing pulse signals in response to movement of said arm;
   a reversible counter connected to said detection means for counting said pulses in an additive sense when said pickup arm is moved in one direction and in a subtractive sense when the pickup arm is moved in an opposite direction;
   memory means for storing first and second count values representative of selected position locations of said pickup arm;
   means operatively associated with the counter and the memory means for comparing the count of said counter with the count values of said memory means;
   motor control means joined to said comparing means, to said motor, and to a pickup arm lifter;
   means for applying an input signal to said motor control means for commencing rotation of said motor and movement of the pickup arm, said motor control means: (1) being responsive to a coincidence between the count in said counter and the first count value in said memory means for actuating the pickup arm lifter to lower the pickup arm; and (2) being responsive to a coincidence between the count in said counter and the second count value in said memory means (a) for actuating the pickup arm lifter to raise the pickup arm and (b) for reversing the rotation of the motor and the direction of movement of the pickup arm.

2. A system as claimed in claim 1, in which: said position-detecting means includes a light-emitting element, a light-detecting element and a scale having a multiplicity of portions of a fixed width disposed at a fixed pitch for allowing the light emitted from said light-emitting element to reach said light-detecting element.

3. A system as claimed in claim 2, in which: said multiplicity of portions are windows for transmitting the incident light intermittently in accordance with the movement of the pickup arm.

* * * * *